United States Patent
Nanjundiah et al.

(10) Patent No.: US 7,914,659 B2
(45) Date of Patent: Mar. 29, 2011

(54) HIGH-CAPACITY CHLORINE DIOXIDE GENERATOR

(75) Inventors: Chenniah Nanjundiah, San Diego, CA (US); Larry L. Hawn, Laguna Niguel, CA (US); Jeffery M. Dotson, Fort Worth, TX (US)

(73) Assignee: PureLine Treatment Systems, LLC, Irvine, CA (US)

( * ) Notice: Subject to any disclaimer, the term of this patent is extended or adjusted under 35 U.S.C. 154(b) by 312 days.

(21) Appl. No.: 11/289,813

(22) Filed: Nov. 30, 2005

(65) Prior Publication Data
US 2006/0113196 A1 Jun. 1, 2006

Related U.S. Application Data

(63) Continuation-in-part of application No. 11/145,398, filed on Jun. 3, 2005, which is a continuation-in-part of application No. 10/902,681, filed on Jul. 29, 2004.

(51) Int. Cl.
*C25B 1/00* (2006.01)
(52) U.S. Cl. ............... 205/412; 205/556; 423/447.1
(58) Field of Classification Search ........... 205/412, 205/556; 423/447.1
See application file for complete search history.

(56) References Cited

U.S. PATENT DOCUMENTS

| | | | |
|---|---|---|---|
| 3,516,790 A | 6/1970 | Westerlund | |
| 3,676,315 A | 7/1972 | Goens et al. | |
| 3,754,081 A | 8/1973 | De Vere et al. | |
| 3,816,077 A | 6/1974 | Rosen et al. | |
| 3,884,777 A | 5/1975 | Harke et al. | |
| 4,276,262 A | 6/1981 | Cowley | |
| 4,308,117 A | 12/1981 | Sweeney | |
| 4,336,228 A | 6/1982 | Cowley | |
| 4,451,444 A | 5/1984 | Santillie et al. | |
| 4,456,510 A * | 6/1984 | Murakami et al. | 205/556 |
| 4,929,434 A | 5/1990 | Lobley et al. | |
| 5,006,326 A | 4/1991 | Mayurnik et al. | |
| 5,242,552 A * | 9/1993 | Coin et al. | 205/556 |
| 5,266,292 A * | 11/1993 | Bagg et al. | 423/400 |
| 5,422,063 A * | 6/1995 | Pelzer | 264/209.1 |
| 5,792,441 A | 8/1998 | Paleologou et al. | |
| 5,968,454 A | 10/1999 | Deacon et al. | |
| 6,051,135 A * | 4/2000 | Lee et al. | 210/192 |
| 6,171,558 B1 | 1/2001 | Simpson | |

(Continued)

FOREIGN PATENT DOCUMENTS

WO      WO-02/14216 A      2/2002

*Primary Examiner* — Melvin C Mayes
*Assistant Examiner* — Melissa Stalder
(74) *Attorney, Agent, or Firm* — McAndrews, Held & Malloy, Ltd.

(57) ABSTRACT

A high capacity chlorine dioxide gas generator includes an anolyte loop for generating chlorine dioxide gas and a cooling system connected to said anolyte loop. A chlorine dioxide solution generator includes a chlorine dioxide gas source, an absorption loop fluidly connected to the chlorine dioxide gas source for effecting the dissolution of chlorine dioxide into a liquid stream, and a cooling system that functions in the chlorine dioxide gas source or the absorption loop. A method of generating chlorine dioxide solution includes providing a chlorine dioxide gas source, dissolving chlorine dioxide into a liquid stream using an absorption loop fluidly connected to the chlorine dioxide gas source, and cooling the chlorine dioxide in at least one of the chlorine dioxide gas source and the absorption loop.

6 Claims, 5 Drawing Sheets

U.S. PATENT DOCUMENTS

| | | | |
|---|---|---|---|
| 6,274,009 B1 * | 8/2001 | Krafton et al. | 204/230.2 |
| 6,468,479 B1 | 10/2002 | Mason et al. | |
| 2003/0007899 A1 | 1/2003 | Charles et al. | |
| 2005/0061741 A1 | 3/2005 | Mainz et al. | |
| 2006/0022360 A1 | 2/2006 | Nanjundiah et al. | |

* cited by examiner

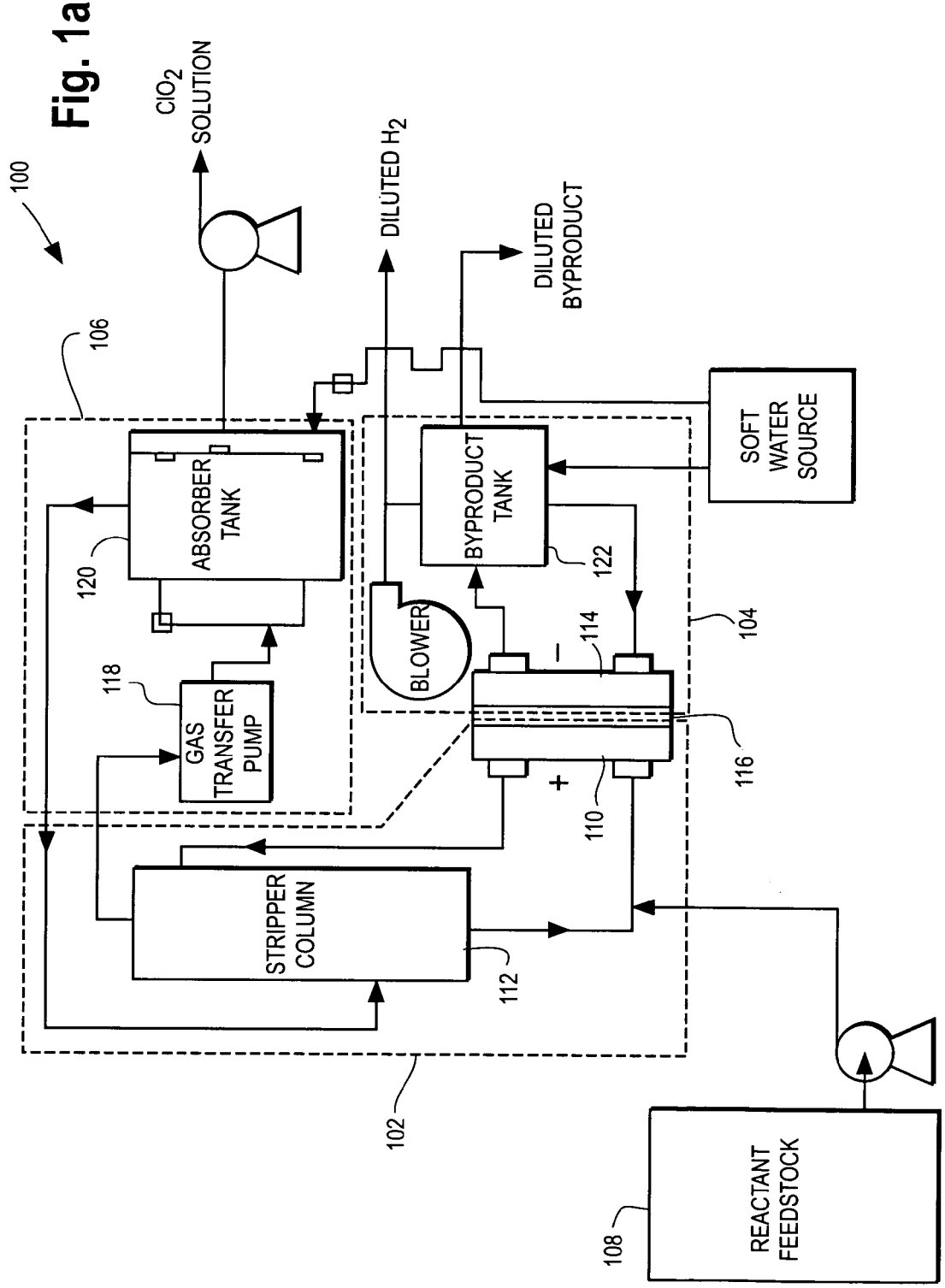

POUND OF CHLORINE DIOXIDE/DAY VS CURRENT

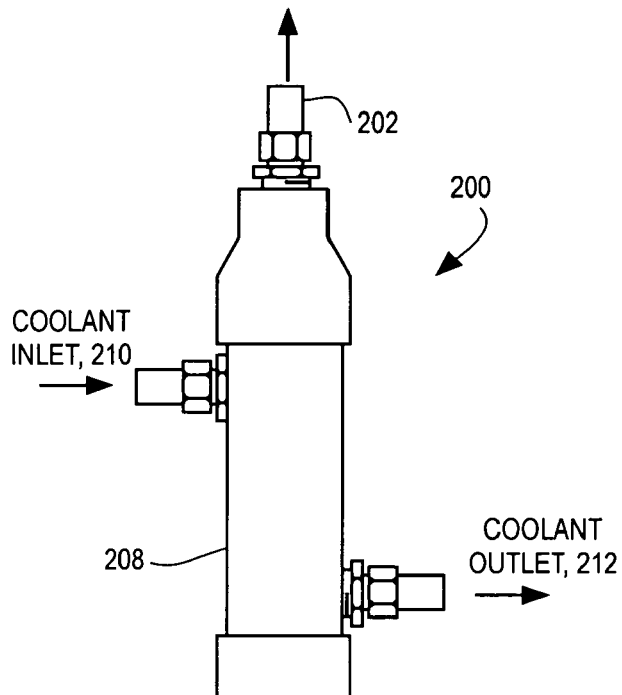
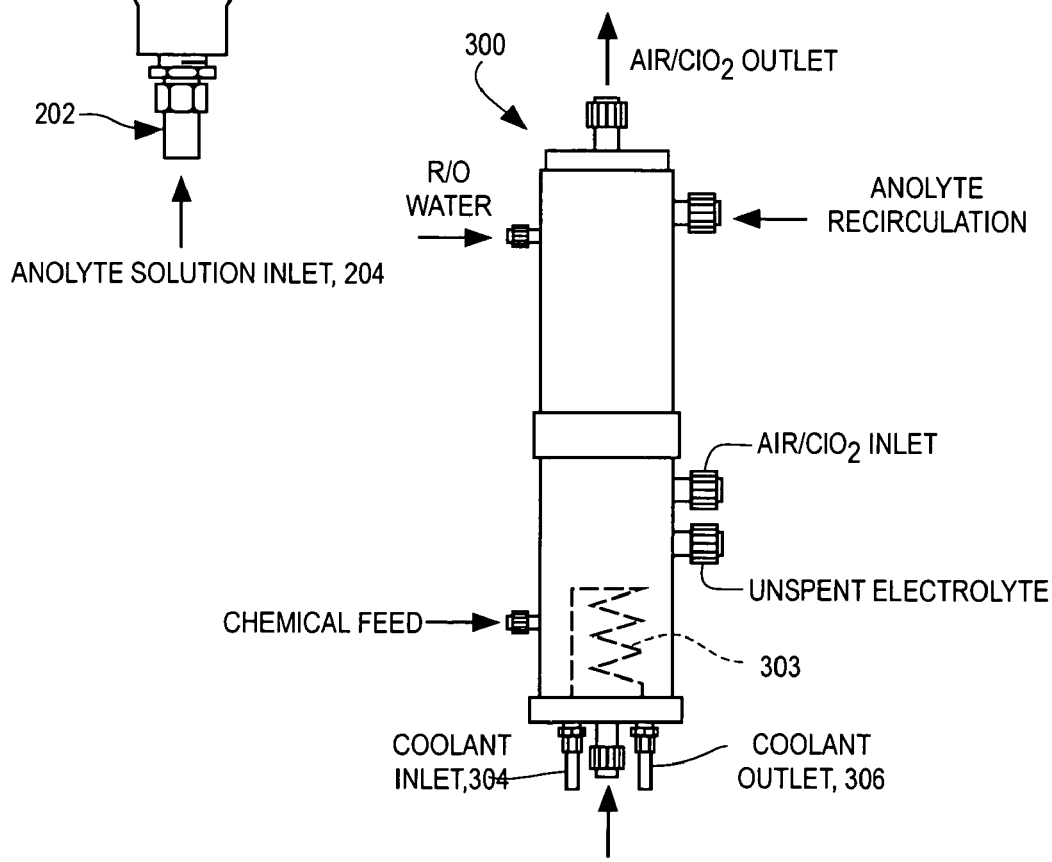

- ANOLYTE OUTLET, 414
- CATHOLYTE OUTLET
- COOLANT LET, 408
- COOLANT INLET, 408
- 402
- 402
- COOLANT OUTLET, 410
- COOLANT OUTLET, 410
- ANOLYTE INLET, 412
- CATHOLYTE INLET 500, 502

500, 502

HIGH-CAPACITY CHLORINE DIOXIDE GENERATOR

CROSS-REFERENCE TO RELATED APPLICATION(S)

This application is a continuation-in-part of U.S. patent application Ser. No. 11/145,398 filed on Jun. 3, 2005, entitled "Chlorine Dioxide Solution Generator With Temperature Control Capability", which is, in turn, a continuation-in-part of U.S. patent application Ser. No. 10/902,681 filed on Jul. 29, 2004, entitled "Chlorine Dioxide Solution Generator". The '398 and '681 applications are each hereby incorporated by reference herein in their entirety.

FIELD OF THE INVENTION

The present invention relates generally to high capacity chlorine dioxide generators. More particularly, the present invention relates to a chlorine dioxide generator that may operate at a high current, in which the temperature of the anolyte loop or the chlorine dioxide gas stream is controlled to avoid overheating associated with operating at a high current.

BACKGROUND OF THE INVENTION

Chlorine dioxide ($ClO_2$) has many industrial and municipal uses. When produced and handled properly, $ClO_2$ is an effective and powerful biocide, disinfectant and oxidizer.

$ClO_2$ is also used extensively in the pulp and paper industry as a bleaching agent, but is gaining further support in such areas as disinfections in municipal water treatment. Other end-uses can include as a disinfectant in the food and beverage industries, wastewater treatment, industrial water treatment, cleaning and disinfections of medical wastes, textile bleaching, odor control for the rendering industry, circuit board cleansing in the electronics industry, and uses in the oil and gas industry.

In water treatment applications, $ClO_2$ is primarily used as a disinfectant for surface waters with odor and taste problems. It is an effective biocide at low concentrations and over a wide pH range. $ClO_2$ is desirable because when it reacts with an organism in water, chlorite results, which studies to date have shown does not pose a significant adverse risk to human health at a concentration of less than 0.8 parts per million (ppm) of chlorite. The use of chlorine, on the other hand, can result in the creation of chlorinated organic compounds when treating water. Such chlorinated organic compounds are suspected to increase cancer risk.

Producing $ClO_2$ gas for use in a $ClO_2$ water treatment process is desirable because there is greater assurance of $ClO_2$ purity when in the gas phase. $ClO_2$ is, however, unstable in the gas phase and will readily undergo decomposition into chlorine gas ($Cl_2$), oxygen gas ($O_2$), and heat. The high reactivity of $ClO_2$ generally requires that it be produced and used at the same location. $ClO_2$ is, however, soluble and stable in an aqueous solution.

The production of $ClO_2$ can be accomplished both by electrochemical and reactor-based chemical methods. Electrochemical methods have an advantage of relatively safer operation compared to reactor-based chemical methods. In this regard, electrochemical methods employ only one precursor, such as a chlorite solution, unlike the multiple precursors that are employed in reactor-based chemical methods. Moreover, in reactor-based chemical methods, the use of concentrated acids and chlorine gas poses a safety concern.

Electrochemical cells are capable of carrying out selective oxidation reaction of chlorite to $ClO_2$. The selective oxidation reaction product is a solution containing $ClO_2$. To further purify the $ClO_2$ gas stream, the gas stream is separated from the solution using a stripper column. In the stripper column, air is passed from the bottom of the column to the top while the $ClO_2$ solution travels from top to the bottom. Pure $ClO_2$ is exchanged from solution to the air. Suction of air is usually accomplished using an eductor, as described in copending and co-owned application Ser. No. 10/902,681. However, a vacuum gas transfer pump can alternatively be employed.

An electrochemical $ClO_2$ generator, such as those described and claimed in the '681 and '398 applications, can be utilized to obtain a higher yield of $ClO_2$ gas or $ClO_2$ solution than those previously disclosed. This can be accomplished by applying a higher current to the electrochemical cell than those previously applied. Applying a higher current to the cell increases the rate of the selective oxidation reaction of chlorite to $ClO_2$, which results in a higher yield of $ClO_2$ gas. A higher yield of $ClO_2$ gas ultimately results in a higher yield of $ClO_2$ solution.

However, the electrolytic cells described in the '681 and '398 applications cannot be safely operated at these higher currents. It is known that $ClO_2$ is unstable and capable of decomposing, in an exothermic reaction, to chlorine and oxygen. Due to this instability, an operating temperature greater than about 163° F. (73° C.) can result in potentially hazardous and less efficient operation of the $ClO_2$ generator.

When more current is applied to the electrochemical cell, more heat is generated in the electrolytic cell anolyte loop. This is problematic because the temperature increase of the electrolytic cell anolyte loop can create an unsafe chlorine dioxide temperature in the anolyte loop such as within the stripper column or at other location in the $ClO_2$ generator such as at the gas transfer pump.

Accordingly, it would be desirable to provide a $ClO_2$ generator capable of operating at a high current. Moreover, it would be desirable that the $ClO_2$ generator have temperature control mechanisms within the chlorine dioxide gas source or anolyte loop such as in the stripper column, around the feed lines to or from the electrochemical cell, or around or within the inlet/outlet pipes to the gas transfer pump.

SUMMARY OF THE INVENTION

The present high capacity chlorine dioxide generator includes an anolyte loop for generating chlorine dioxide gas and a cooling system connected to the anolyte loop.

In one embodiment, the cooling system is made up of an inner tube through which reactant feedstock or chlorine dioxide solution is directed, an outer jacket surrounding the inner tube and a coolant material within the outer jacket. This cooling system can be interposed between a reactant feedstock stream and an electrochemical cell that is fluidly connected to that reactant feedstock stream such that the reactant feedstock is directed through the cooling system. This cooling system could also be interposed between the positive end of an electrochemical cell and a stripper column that is fluidly connected to the electrochemical cell such that a chlorine dioxide solution directed from the positive end of the electrochemical cell is directed through the stripper column. Alternatively this cooling system could be interposed between the negative end of an electrochemical cell and a byproduct tank.

In another embodiment, the cooling system is made up of a coiled tube placed within the chlorine dioxide gas generator and a coolant material within the coiled tube. This cooling system could be located in the interior space of a stripper column.

Another embodiment has a cooling system made up of a chamber in proximity with a surface of an electrochemical cell and a coolant material within the chamber.

Yet another embodiment has a cooling system having a fluid circulation apparatus directing fluid flow onto a surface of an electrochemical cell. This apparatus can be enhanced with a plurality of fins protruding from the surface of the electrochemical cell.

In one embodiment, the chlorine dioxide solution generator has an electrochemical cell operating at a current greater than 120 A.

In another embodiment, the chlorine dioxide solution generator maintains a chlorine dioxide gas temperature of less than 130° F. (54.4° C.).

In another aspect, the present chlorine dioxide solution generator includes a chlorine dioxide gas source, an absorption loop fluidly connected to the chlorine dioxide gas source for effecting the dissolution of chlorine dioxide into a liquid stream, and a cooling system that functions in the chlorine dioxide gas source or the absorption loop.

Other embodiments have a cooling system functioning within the absorption loop that is made up of at least one water flush injector fluidly connected before or after a gas transfer pump to allow for intermittent water injection. The water flush injector can include at least one solenoid valve. The water flush injector can be controlled by program logic or a standalone timer.

A method of generating chlorine dioxide solution includes providing a chlorine dioxide gas source, dissolving chlorine dioxide into a liquid stream by employing an absorption loop fluidly connected to the chlorine dioxide gas source and cooling occurring within the chlorine dioxide gas source or the absorption loop.

BRIEF DESCRIPTION OF THE DRAWINGS

FIG. 1a is a process flow diagram of an embodiment of the present chlorine dioxide generator.

FIG. 2 is a side view and flow diagram of an embodiment of the present cooling system for piping within the chlorine dioxide gas source.

FIG. 3 is a side view and flow diagram of an embodiment of the present cooling system for operating within the interior of a stripper column of the chlorine dioxide gas source.

DETAILED DESCRIPTION OF PREFERRED EMBODIMENT(S)

Figure 1B:
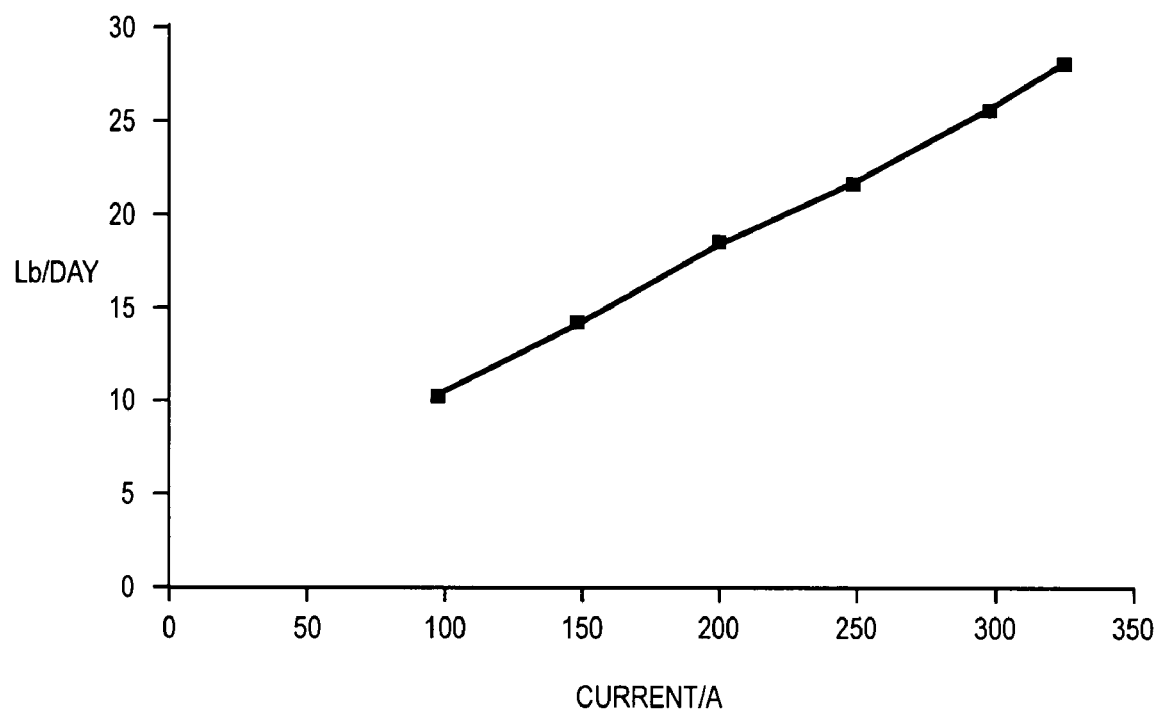
FIG. 1b is a graph showing the relationship between current applied and pounds of $ClO_2$ generated for a typical 10 lb/day cell.

The embodiments disclosed herein are intended to be illustrative and should not be read as limitations of the current disclosure.

FIG. 1a is a process flow diagram of an embodiment of the present $ClO_2$ generator 100. The process flow of FIG. 1a consists of three sub-processes: an anolyte loop 102, a catholyte loop 104, and an absorption loop 106. The purpose of the anolyte loop 102 is to produce a chlorine dioxide ($ClO_2$) gas by oxidation of chlorite, and the process can be referred to as a $ClO_2$ gas generator loop. The $ClO_2$ gas generator loop can be described as a $ClO_2$ gas source. The catholyte loop 104 of the $ClO_2$ gas generator loop produces sodium hydroxide and hydrogen gas by reduction of water. The anolyte loop and catholyte loop together can also be referred to as a $ClO_2$ gas source. Once the $ClO_2$ gas is produced in the $ClO_2$ gas generator loop, the $ClO_2$ gas can be transferred to the absorption loop 106 where the gas is dissolved or infused into a liquid. Here, $ClO_2$ gas, which is produced in the $ClO_2$ gas generator loop, can be dissolved or infused into an aqueous liquid stream directed through absorption loop 106.

The anolyte loop 102 may include a reactant feedstock 108 fluidly connected to an electrochemical cell 116. The reactant feedstock is delivered to the positive end of the electrochemical cell 110 and is oxidized to form $ClO_2$ gas, which is dissolved in an electrolyte solution along with other side products to form a chlorine dioxide solution. The chlorine dioxide solution is directed to a stripper column 112 where the pure chlorine dioxide gas is stripped off from other side products. The pure chlorine dioxide gas can then be directed to a gas transfer pump 118 using a vacuum or other similar means.

The catholyte loop 104 handles byproducts produced from the electrochemical reaction of the reactant feedstock 108 solution in the anolyte loop 102. These byproducts react at the negative end of the electrochemical cell 114 and then proceed to the byproduct tank 122 that is fluidly connected to the electrochemical cell. For example, where a sodium chlorite ($NaClO_2$) solution is used as the reactant feedstock 108, water in the catholyte loop 104 is reduced to produce hydroxide and hydrogen gas. The reaction of the anolyte loop 102 and catholyte loop 104 where sodium chlorite is used as the reactant feedstock 108 is represented by the following net chemical equation:

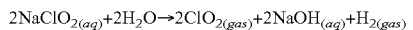

$$2NaClO_{2(aq)} + 2H_2O \rightarrow 2ClO_{2(gas)} + 2NaOH_{(aq)} + H_{2(gas)}$$

The absorption loop 106 dissolves the chlorine dioxide gas from the anolyte loop or the $ClO_2$ gas source into an aqueous chlorine dioxide solution. The chlorine dioxide gas is directed from the stripper column 112 using a gas transfer pump 118. The gas transfer pump 118 can be a part of the anolyte loop 102 or the absorption loop 106. After passing through the gas transfer pump the chlorine dioxide gas can be directed to an absorber tank 120. Before $ClO_2$ gas is directed to the absorber tank 120, the tank 120 can be filled with water to approximately 0.5 inch (13 mm) below a main level control. The flow switch controls the amount of liquid delivered to the absorber tank 120. A process delivery pump feeds the $ClO_2$ solution from the absorption tank 120 to the end process without including air or other gases. The process delivery pump is sized to deliver a desired amount of water per minute. The amount of $ClO_2$ gas delivered to the absorber tank 120 is set by the vacuum and delivery rate set by the gas transfer pump 118.

The chlorine dioxide generator 100 can be utilized to obtain a higher yield of $ClO_2$ gas, or a $ClO_2$ solution, by applying a higher current to the electrochemical cell than those previously applied. FIG. 1b illustrates a relationship between current and pounds of $ClO_2$ generated for a typical 10 lb/day cell. As the current applied to the cell is increased the pounds of $ClO_2$ that can be generated increases. The high-capacity current can be greater than 50 A, but a desirable embodiment contemplates cooling for a system that operates on the order of greater than 120 A. Applying a higher current to the cell increases the rate of the selective oxidation reaction of, for example, chlorite to $ClO_2$, which can result in a higher yield of $ClO_2$ gas. A higher yield of $ClO_2$ gas can result in a higher yield of $ClO_2$ solution.

FIG. 2 illustrates an embodiment of the present cooling system 200 for use, for example, with piping that may be used within the chlorine dioxide gas source or anolyte loop 102. This cooling system 200 can be interposed between a reactant feedstock 108 stream and an electrochemical cell 116 that is fluidly connected to the reactant feedstock stream such that reactant feedstock 108 is directed through the cooling system 200 before entering the electrochemical cell 116. The cooling system 200 can also be interposed between the positive end of an electrochemical cell 110 and a stripper column 112 that is fluidly connected to the electrochemical cell 116 such that a chlorine dioxide solution directed from the positive end of the electrochemical cell 110 is directed through the cooling system 200. The cooling system 200 can also be interposed between the negative end of an electrochemical cell 114 and a byproduct tank 122 that is fluidly connected to the electrochemical cell 115 such that a byproduct stream directed from the negative end of the electrochemical cell 114 is directed through the cooling system 200.

The cooling system 200 can have an inner tube 202. The reactant feedstock 108 or chlorine dioxide solution can enter the inner tube 202 through an inlet 204, passes through the inner tube 202 and exits through an outlet 206. The inner tube 202 can be made out of material that is inert to chlorine dioxide. Metals such as titanium and tantalum can be used or inert plating materials may also be used.

The inner tube 202 is surrounded by an outer jacket 208. Coolant enters the outer jacket through a coolant inlet 210 and exits through a coolant outlet 212. The outer jacket 208 should be made of an insulating material such as poly(vinyl chloride) (PVC), chlorinated poly(vinyl chloride) (CPVC) or poly(tetrafluoroethylene) (trade name Teflon®). A coolant material, such as water or silicon oil, can be cooled with Freon® or equivalent materials and then pumped through the outer jacket 208. The coolant material then cools the reactant feedstock 108 or chlorine dioxide solution inside the inner tube 202. It is desirable that the coolant temperature is such that it cools the reactant feedstock 108 or chlorine dioxide solution to a temperature of less than 130° F. (54.4° C.) and allows downstream $ClO_2$ gas to also be below 130° F. (54.4° C.). However, it is desirable that the coolant material does not freeze the reactant feedstock 108 or chlorine dioxide solution. It is further desirable that the Freon® or equivalent material does not lower the temperature of the coolant material to a point where the coolant material cannot be pumped through the outer jacket 208.

FIG. 3 illustrates another embodiment of the present cooling system 300 for operating within the interior of a stripper column of the chlorine dioxide gas source 102. The cooling system is made up of a coiled tube 303 placed within a chlorine dioxide gas source or anolyte loop 102. The coiled tube 303 can comprise a material that is inert to chlorine dioxide such as titanium or tantalum. A coolant material is directed through the coiled tube 303. The coolant enters through a coolant inlet 304 is directed through the coiled tube 303 and exits from a coolant outlet 306. Possible coolant materials can include water and silicon oil. The coolant material can be cooled by Freon® or equivalent materials and pumped through the coiled tube 303.

The cooling system 300 can be located in the interior space of a stripper column 112. The coolant material flows through the coiled tube 303 and cools the chlorine dioxide solution in the stripper column 112. It is desirable that the coolant temperature is such that it cools the chlorine dioxide solution to a temperature of less than 130° F. (54.4° C.) and allows downstream ClO gas to also be below 130° F. (54.4° C.). However, the coolant material temperature should also be such that it does not freeze the chlorine dioxide solution.

Figure 4:
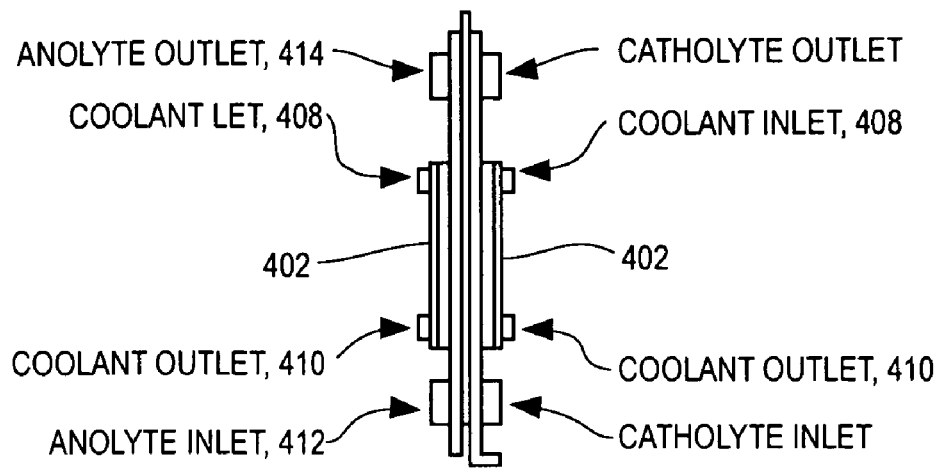
FIG. 4 is a side view and flow diagram of an embodiment of the present cooling system for operating in proximity to the surface of an electrochemical cell of the chlorine dioxide gas source.

FIG. 4 illustrates a cross sectional diagram of another embodiment of the present cooling system 400 functioning within the chlorine dioxide gas source 102 in proximity with the surface of an electrochemical cell 116. The cooling system comprises a chamber 402 in proximity with the positive end of the electrochemical cell 110 and/or the negative end of the electrochemical 114. It is preferred that the proximity of the chamber 402 to the electrochemical cell is such that the chamber 402 effects cooling of the electrochemical cell. The chamber 402 may be in direct contact or adjacent to the electrochemical cell. Coolant material enters the chamber 402 through a coolant inlet 408, is directed through the chamber 402 and exits from a coolant outlet 410. The coolant material can be a non-conducting material such as pure water or silicon oil. The coolant material can be cooled using Freon® or equivalent materials and then pumped through the chamber 402.

The reactant feedstock 108 enters the positive end of the electrochemical cell 110 through an anolyte inlet 412, where the reactant feedstock 108 can be oxidized to form a $ClO_2$ gas, which is dissolved in an electrolyte solution along with other side products. The $ClO_2$ solution with the side products can be directed out of the electrochemical cell at the anolyte outlet 414. The $ClO_2$ solution can then be cooled by the coolant material in chamber 402. It is desirable for the coolant material temperature to be such that the coolant material cools the downstream $ClO_2$ gas and the chlorine dioxide solution or the catholyte solution to a temperature of less than 130° F. (54.4° C.). However, it is further desirable that the coolant temperature does not freeze the chlorine dioxide solution or catholyte solution.

Figure 5:
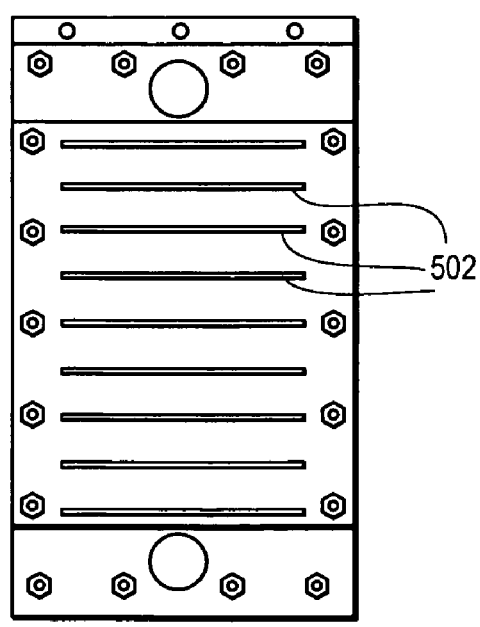
FIG. 5 is a frontal view of an electrochemical cell having a plurality of fins in accordance with an embodiment of the present disclosure.

Another embodiment of the present cooling system is where a fluid circulation apparatus is located so as to direct fluid flow onto the surface of the electrochemical cell 500, such as shown by the example in FIG. 5. A fluid can be a liquid or gas tending to flow or conform to the outline of its container. Examples of fluids include water, air, oil and an inert gas. One embodiment blows air onto the surface of an electrochemical cell 500. This cools the chlorine dioxide solution as it passes through the electrochemical cell 500.

In order to increase the effectiveness of cooling by the fluid circulation apparatus a plurality of fins 502 can be added to the surface of the electrochemical cell 500. FIG. 5 illustrates a frontal view of the surface of an electrochemical cell 500 having a plurality of fins 502 in accordance with an embodiment of the present disclosure. The plurality of fins 502 can be made of a metal such as stainless steel or copper or other such material that may be used to build the structure of the electrochemical cell. The plurality of metal fins 502 increases the total cooling surface area of the electrochemical cell, resulting in more effective cooling.

Figure 6:
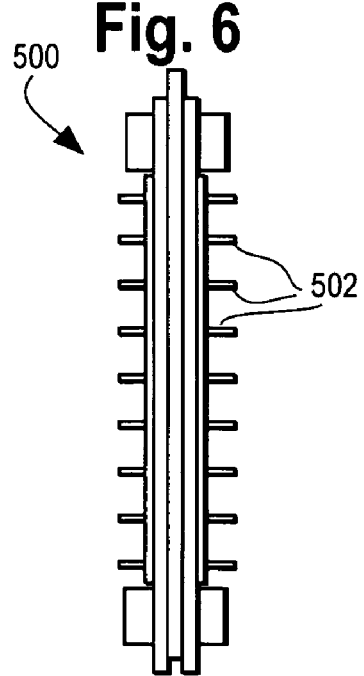
FIG. 6 is a side view of an electrochemical cell having a plurality of fins in accordance with an embodiment of the present disclosure.

FIG. 6 illustrates a side view of an electrochemical cell having a plurality of fins 502 in accordance with an embodiment of the present disclosure.

Figure 7:
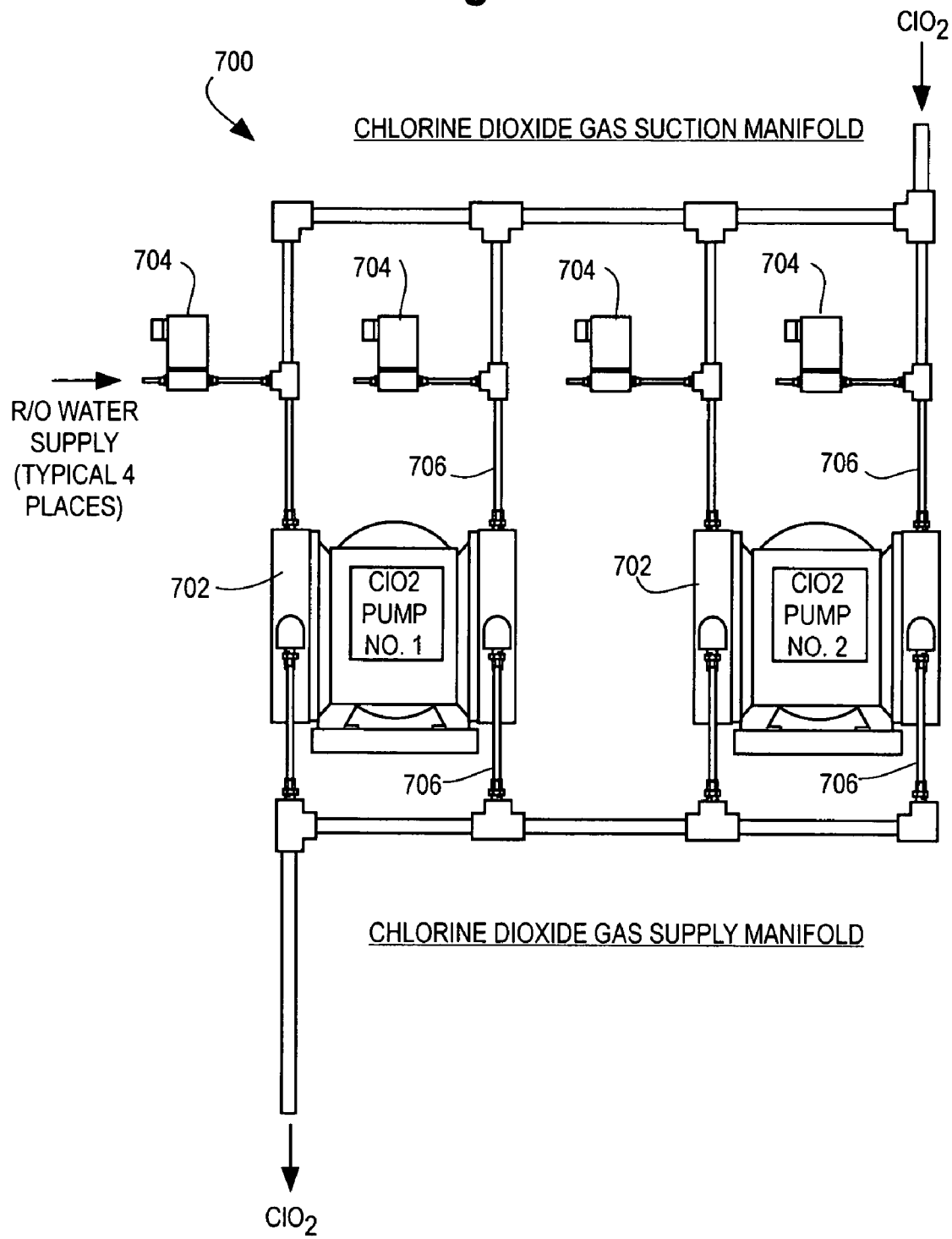
FIG. 7 is a process flow diagram of an embodiment of the present cooling system functioning within the absorption loop where water is injected at intermittent intervals.

FIG. 7 illustrates an embodiment of the present cooling system 700 operating, for example, within the absorption loop 106. Chorine dioxide gas exits the stripper column 112 and is directed through the a gas transfer pump 702. In this embodiment, the chlorine dioxide gas entering the gas transfer pump 702 is cooled by intermittently injecting water into the $ClO_2$ gas flow. At least one water flush injector 704 is fluidly connected to the gas transfer pump 702. The water flush injector 704 could be a solenoid valve or other method of controlling water flow. The water flush injector 704 can be placed either before the gas transfer pump 702 in the piping system 706 as shown in FIG. 7 or it can be placed in the piping system 706 after (not shown) the gas transfer pump 702.

It is desirable to add water to adequately cool the $ClO_2$ gas to less than 130° F. (54.4° C.). However, it is not necessarily preferred to add water constantly because this may diminish the vacuum in the gas transfer pump 702. Therefore, it is preferred to add water at intermittent intervals. In this context, the term intermittent contemplates that the time between water injections and the length of each injection can, but need not, be constant. In one embodiment, at least 30 seconds is allowed between each water injection. Each water injection can last for approximately 1 to 30 seconds.

The water flow injectors 704 can be operated through a program logic control (PLC) system that can include displays. Alternatively, the water flow injectors 704 can be controlled by a standalone timer.

The water flush injectors 704 can also be used to extend the life of pump heads. Chlorine dioxide gas carries unreacted salts, which build deposits on the pump heads over time. Intermittently injecting water helps keep the pump heads clean.

TABLE 1

Effect of Cell Current and Water Injection on Cooling $ClO_2$ Gas Discharged from Pump for a 10 lb/day Unit

| Cell Current | Water Injection | Water on time | Water off time | Temperature |
| --- | --- | --- | --- | --- |
| 100 A | No | 0 sec | 0 sec | 120° F. (48.9° C.) |
| 200 A | No | 0 sec | 0 sec | 150° F. (65.6° C.) |
| 200 A | Yes | 2 sec | 300 sec | 128° F. (53.3° C.) |

As an example of the $ClO_2$ cooling using water injection, increasing the current that is applied to an electrochemical cell in a chlorine dioxide gas generator from 100 A to 200 A raises the temperature of the $ClO_2$ gas coming out of the gas transfer pump 118 from 120° F. to 150° F. (48.9° C. to 65.6° C.). The water flush injection technique outlined above can be used to lower the temperature of the $ClO_2$ gas coming out of the gas transfer pump. By injecting water for 2 seconds every 300 seconds the temperature of the $ClO_2$ gas coming out of the gas transfer pump at 200 A is lowered from 150° F. (65.6° C.) to 128° F. (53.3° C.).

TABLE 2

Cooling Effect of Coolants on a 10 lb/day Unit

| Cell Current | $ClO_2$ solution temperature | $ClO_2$ solution temperature with a cooling system |
| --- | --- | --- |
| 100 A | 103° F. (39.4° C.) | 65° F.-85° F. (18.3° C.-29.4° C.) |
| 150 A | 115° F. (46.1° C.) | 65° F.-85° F. (18.3° C.-29.4° C.) |
| 200 A | 125° F. (51.7° C.) | 65° F.-85° F. (18.3° C.-29.4° C.) |
| 244 A | 135° F. (57.2° C.) | 65° F.-85° F. (18.3° C.-29.4° C.) |
| 300 A | 142° F. (61.1° C.) | 65° F.-85° F. (18.3° C.-29.4° C.) |
| 345 A | 147° F. (63.9° C.) | 65° F.-85° F. (18.3° C.-29.4° C.) |

As an example of the $ClO_2$ cooling using coolant material, when a current applied to an electrochemical cell in a chlorine dioxide gas generator increases, the temperature of the $ClO_2$ solution increases. However, by using the cooling coil or jacket as outlined in this disclosure a temperature of 65° F.-85° F. (18.3° C.-29.4° C.) can be maintained.

$ClO_2$ gas can be made using many different processes and the present high-capacity chlorine dioxide generator can be used with a variety of such processes. Such processes include, but are not limited to, using electrochemical cells and a sodium chlorite solution, acidification of chlorite, reduction of chlorates by acidification, and reduction of chlorates by sulfur dioxide.

While particular elements, embodiments and applications of the present disclosure have been shown and described, it will be understood, of course, that the disclosure is not limited thereto since modifications can be made by those skilled in the art without departing from the scope of the present disclosure, particularly in light of the foregoing teachings.

What is claimed is:

1. A method of generating a chlorine dioxide solution comprising:
    (a) generating chlorine dioxide gas in a chlorine dioxide gas source having an anolyte loop at least partially comprising an electrochemical cell operating at a current greater than 120 A;
    (b) effecting dissolution of said chlorine dioxide gas into a liquid stream to form a chlorine dioxide solution in an absorption loop fluidly connected to said chlorine dioxide gas source; and
    (c) operating a cooling system within said absorption loop to cool said chlorine dioxide solution, said cooling system further comprises at least one water flush injector fluidly connected before a gas transfer pump, said gas transfer pump located within said absorption loop and after said chlorine dioxide gas source;
    (d) adding water from the at least one water flush injector at intermittent intervals to cool said chlorine dioxide gas to a temperature of less than 130° F. (54.4° C.).

2. The method of claim 1 wherein each of said intermittent intervals is at least 30 seconds.

3. The method of claim 1 wherein each of said intermittent intervals is approximately 1 to 30 seconds.

4. A method of generating a chlorine dioxide solution comprising:
    (a) generating chlorine dioxide gas in a chlorine dioxide gas source having an anolyte loop at least partially comprising an electrochemical cell operating at a current greater than 120 A;
    (b) effecting dissolution of said chlorine dioxide gas into a liquid stream to form a chlorine dioxide solution in an absorption loop fluidly connected to said chlorine dioxide gas source; and
    (c) operating a cooling system within said absorption loop to cool said chlorine dioxide solution, said cooling system further comprises at least one water flush injector fluidly connected after a gas transfer pump, said gas transfer pump located within said absorption loop and after said chlorine dioxide gas source;
(d) adding water from the at least one water flush injector at intermittent intervals to cool said chlorine dioxide gas to a temperature of less than 130° F. (54.4° C.).

5. The method of claim 4 wherein each of said intermittent intervals is at least 30 seconds.

6. The method of claim 4 wherein each of said intermittent intervals is approximately 1 to 30 seconds.

* * * * *